(12) United States Patent
Buff et al.

(10) Patent No.: US 6,412,545 B1
(45) Date of Patent: Jul. 2, 2002

(54) CARRYING CASE FOR PROTECTING HEAT SENSITIVE MATERIALS

(76) Inventors: Paul C. Buff; Deborah J. Buff, both of 6007 Hickory Valley Rd., Nashville, TN (US) 37205

( * ) Notice: Subject to any disclaimer, the term of this patent is extended or adjusted under 35 U.S.C. 154(b) by 0 days.

(21) Appl. No.: 09/931,363

(22) Filed: Aug. 16, 2001

(51) Int. Cl.$^7$ ................................ F28D 19/00
(52) U.S. Cl. ..................... 165/10; 62/457.2; 126/400
(58) Field of Search ..................... 62/457.7, 457.2; 126/400; 165/10

(56) References Cited

U.S. PATENT DOCUMENTS

| | | | | |
|---|---|---|---|---|
| 4,429,793 A | * | 2/1984 | Ehmann | 206/366 |
| 4,482,010 A | | 11/1984 | Cordon | 165/53 |
| 4,528,439 A | | 7/1985 | Marney, Jr. et al. | 219/386 |
| 4,856,294 A | | 8/1989 | Scaringe et al. | 62/259.3 |
| 5,237,838 A | * | 8/1993 | Merritt-Munson | 383/110 |
| 5,290,904 A | | 3/1994 | Colvin et al. | 428/68 |
| 5,647,226 A | | 7/1997 | Scaringe et al. | 62/457.2 |
| 5,865,314 A | * | 2/1999 | Jacober | 150/117 |
| 5,956,968 A | * | 9/1999 | Grabowski | 220/500 |
| 6,145,337 A | * | 11/2000 | Wilson | 62/457.1 |
| 6,253,570 B1 | * | 7/2001 | Lustig | 62/125 |

* cited by examiner

*Primary Examiner*—William E. Tapolcai
(74) *Attorney, Agent, or Firm*—Donald J. Ersler

(57) ABSTRACT

A carrying case for protecting heat sensitive materials includes a first portion, a second portion, and a closure device. The closure device seals the first portion to the second portion. Each portion includes a retainer which contains a phase change material. The retainer is covered on an outside with an insulation layer. The insulation layer and retainer are preferably covered with a fabric layer. A second embodiment of a carrying case for protecting heat sensitive materials includes a cover, a container, and a closure device. The walls of the container and cover preferably include a retainer which contains phase change material, an insulation layer, an outer fabric layer, and an inner fabric layer. A third embodiment of a carrying case for protecting heat sensitive materials includes a pouch which is sealable with a closure device. The wall of the pouch preferably includes a fabric outer layer, a flexible foam outer layer, a phase change layer, a flexible foam inner layer, and a fabric inner layer. The closure device for all embodiments may be a zipper; a hook and loop fastener; a latch or any other suitable closure device.

34 Claims, 4 Drawing Sheets

CARRYING CASE FOR PROTECTING HEAT SENSITIVE MATERIALS

BACKGROUND OF THE INVENTION

1. Field of the Invention

The present invention relates generally to carrying cases and more specifically to a carrying case for protecting heat sensitive materials without the use of refrigeration.

2. Discussion of the Prior Art

There are many different methods for storing temperature sensitive materials in some type of container or enclosure. A powered cooling device which keeps the temperature sensitive item at a particular temperature may be used, except it would be impractical to carry or ship a container with a powered cooling device. A frozen liquid may be used to keep the temperature sensitive item from excess heat. However, temperature sensitive items such as cosmetics, medical supplies, or the like should be maintained at room temperature. The temperature sensitive items may be damaged if the temperature falls below their desired temperature range as the result of the introduction of excessively low temperatures. Another method utilizes a phase change material (PCM). The phase change material will absorb a large amount of energy while going through a phase change from solid to liquid.

Several patents disclose utilizing a phase change material in a rigid container. U.S. Pat. No. 4,528,439 to Marney, Jr. et al. discloses a portable thermally insulated case for use in oil and gas exploration. Oil and gas exploration occurs in hostile climates as cold as −40 degrees Fahrenheit (F). The phase change material is an electrically preheated mixture of water, gelatin, sodium benzoate and a biocide. When the temperature falls below 22 degrees F., the phase change material begins to freeze, thereby releasing its latent heat of fusion to the contents in the case and preventing the contents inside the case from falling below 22 degrees F. for an extended period.

U.S. Pat. No. 4,482,010 to Cordon discloses a method and apparatus for storing energy by matching a phase change material contained in the walls of a building to the average outdoor ambient temperature to maintain the interior of the building at the average outdoor temperature. U.S. Pat. No. 5,647,226 to Scaringe et al. discloses a shipping container for animal parts lined with a phase change having a phase change temperature that matches a predicted ambient shipping temperature.

However, none of these patents disclose a container that substantially matches the phase change temperature of a phase change material to the desired maximum temperature of the contents within a carrying case; nor do these patents disclose a container which may be easily sealed and unsealed to retain small items for hand carrying or insertion into a purse or the like.

Accordingly, there is a clearly felt need in the art for a carrying case for protecting heat sensitive materials which substantially matches the phase change temperature of a phase change material to the desired maximum temperature of the contents within a carrying case. Further, there is a need for a carrying case for protecting heat sensitive materials which may be easily sealed, and is compact in size.

SUMMARY OF THE INVENTION

The present invention provides a carrying case for protecting heat sensitive materials which has a compact size. A carrying case for protecting heat sensitive materials includes a first portion, a second portion, and a closure device. The closure device seals the first portion to the second portion. Each portion preferably includes a PCM retainer, insulation layer, outer fabric layer, and inner fabric enclosure. The PCM retainer is filled with a phase change material. The insulation layer is attached to an outside surface of the PCM retainer. The outer fabric layer is attached to an outside surface of the insulation layer and the inner fabric enclosure is attached to an inside surface of each PCM retainer. Preferably, the first and second portions are pivotally attached to each other by sewing a fabric hinge to a bottom of each portion. The closure device may be a zipper; a hook and loop fastener; a latch; or any other suitable closure device.

A second embodiment of a carrying case for protecting heat sensitive materials includes a cover, a container, and a closure device. The closure device seals a bottom of the cover to a top of the container. The cover preferably includes a cover PCM retainer, a cover insulation layer, a cover outer fabric layer, and a cover inner fabric layer. The cover PCM retainer is filled with a phase change material. The cover insulation layer is attached to an outside surface of the cover PCM retainer. The cover outer fabric layer is attached to an outside surface of the cover insulation layer and the cover inner fabric layer is attached to an inside surface of the cover PCM retainer.

The container preferably includes a container PCM retainer, a container insulation layer, a container outer fabric layer, and a container inner fabric layer. The container PCM retainer is filled with a phase change material. The container insulation layer is attached to an outside surface of the container retainer. The outer container fabric layer is attached to an outside surface of the container insulation layer and the inner container fabric layer is attached to an inside surface of the container PCM retainer. Preferably, the cover is pivotally attached to the container by sewing a fabric hinge to a top edge of the container fabric layer and to a portion of a bottom edge of the cover fabric layer. The closure device may be a zipper; a hook and loop fastener; a latch; or any other suitable closure device.

A third embodiment of a carrying case for protecting heat sensitive materials includes a pouch which is sealable with a closure device. The wall of the pouch preferably includes a fabric outer layer, a flexible insulating outer layer, a phase change layer, a flexible insulating inner layer, and a fabric inner layer. The phase change layer includes a first film layer, a second film layer, and phase change material heat sealed between the film layers. The phase change material is preferably heat sealed in a plurality of pockets. The closure device may be a zipper; a hook and loop fastener; or any other suitable closure device.

Accordingly, it is an object of the present invention to provide a carrying case for protecting heat sensitive materials which has flexible walls.

It is a further object of the present invention to provide a carrying case for protecting heat sensitive materials which may be easily sealed.

It is yet a further object of the present invention to provide a carrying case for protecting heat sensitive materials which substantially matches the phase change temperature of a phase change material to the desired maximum temperature of the contents within the carrying case.

Finally, it is another object of the present invention to provide a carrying case for protecting heat sensitive materials which has a compact size.

These and additional objects, advantages, features and benefits of the present invention will become apparent from the following specification.

DETAILED DESCRIPTION OF THE PREFERRED EMBODIMENTS

Figure 1:
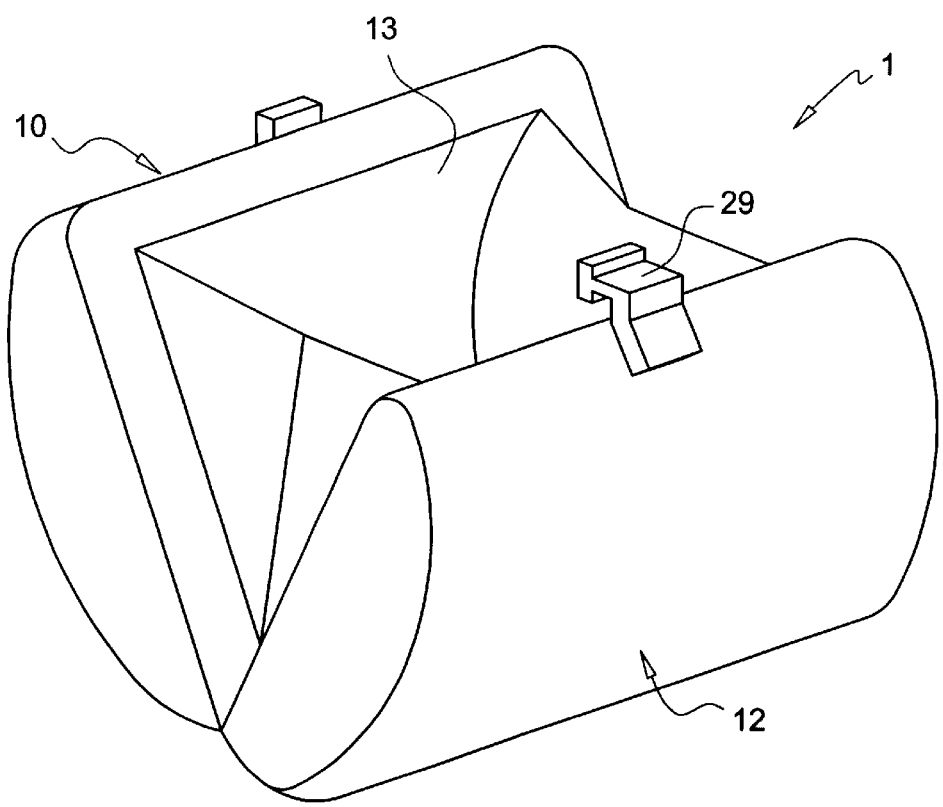
FIG. 1 is a perspective view of an open carrying case for protecting heat sensitive materials in accordance with the present invention.
Figure 2:
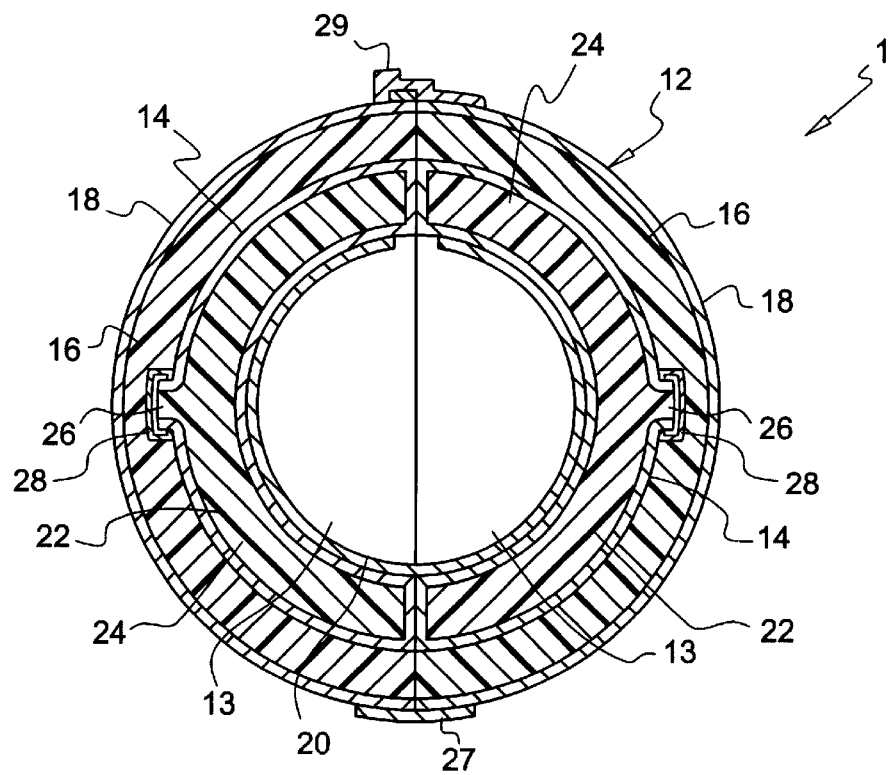
FIG. 2 is a cross sectional view of a carrying case for protecting heat sensitive materials in accordance with the present invention.

With reference now to the drawings, and particularly to FIG. 1, there is shown a perspective view of a carrying case for protecting heat sensitive materials 1. With reference to FIG. 2, the carrying case for protecting heat sensitive materials 1 includes a first portion 10, a second portion 12, and a closure device. The closure device seals the first portion 10 to the second portion 12. Each portion preferably includes a PCM retainer 14, insulation layer 16, outer fabric layer 18, and inner fabric enclosure 20. The PCM retainer 14 includes a hollow cavity 22 which is filled with a phase change material 24. The PCM retainer 14 is preferably fabricated by a blow molding process. The phase change material 24 is melted and poured through a spout 26. The spout 26 is sealed with a cap 28. A clearance opening is formed in the cover insulation layer 16 for the cap 28. Other devices or structures may be used to retain the phase change material 24 such as that disclosed in FIGS. 6 & 7. The use of palm kernel oil has been found satisfactory as a phase change material 24 for use with many items stored in the carrying case 1. However, other phase change materials may also be used such as Sun Wax P-116.

The insulation layer 16 is preferably attached to an outside surface of the PCM retainer 14 with any suitable attachment process. The insulation layer 16 is preferably fabricated from a molded polyurethane or polystyrene foam, but other materials may also be used. The outer fabric layer 18 is attached to an outside surface of the insulation layer 16 with any suitable attachment process. The inner fabric enclosure 20 is attached to an internal cavity 13 formed in each PCM retainer 14 with any suitable attachment process. The inner fabric enclosure 20 is similar in construction to the pocket in a coin purse. Preferably, the first and second portions are pivotally attached to each other by sewing a fabric hinge 27 to a bottom of each portion; other pivotal attachment methods may also be used. The closure device may be a zipper; a hook and loop fastener; a latch 29 as shown in FIGS. 1 & 2; or any other suitable closure device.

Figure 3:
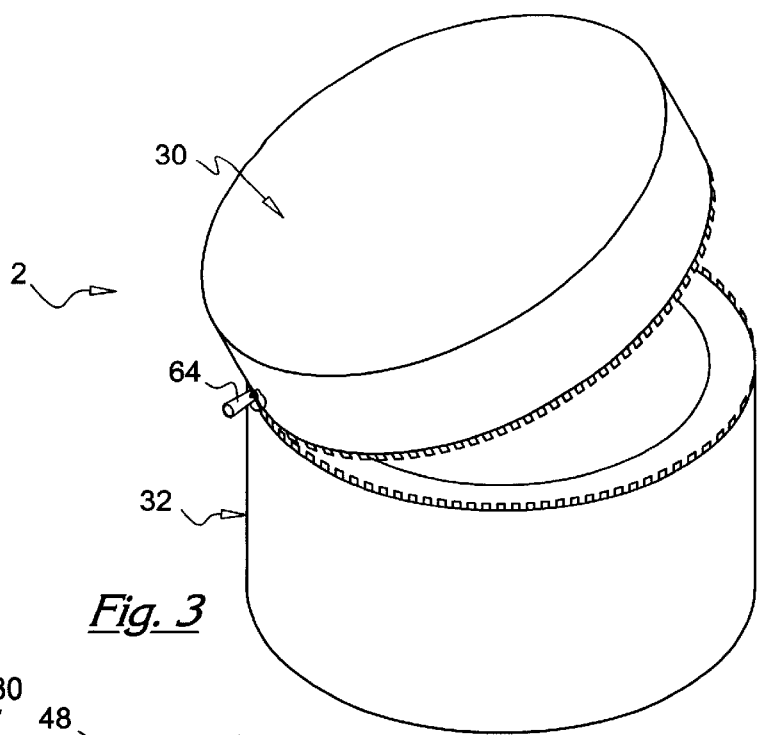
FIG. 3 is a perspective view of a second embodiment of an open carrying case for protecting heat sensitive materials in accordance with the present invention.
Figure 4:
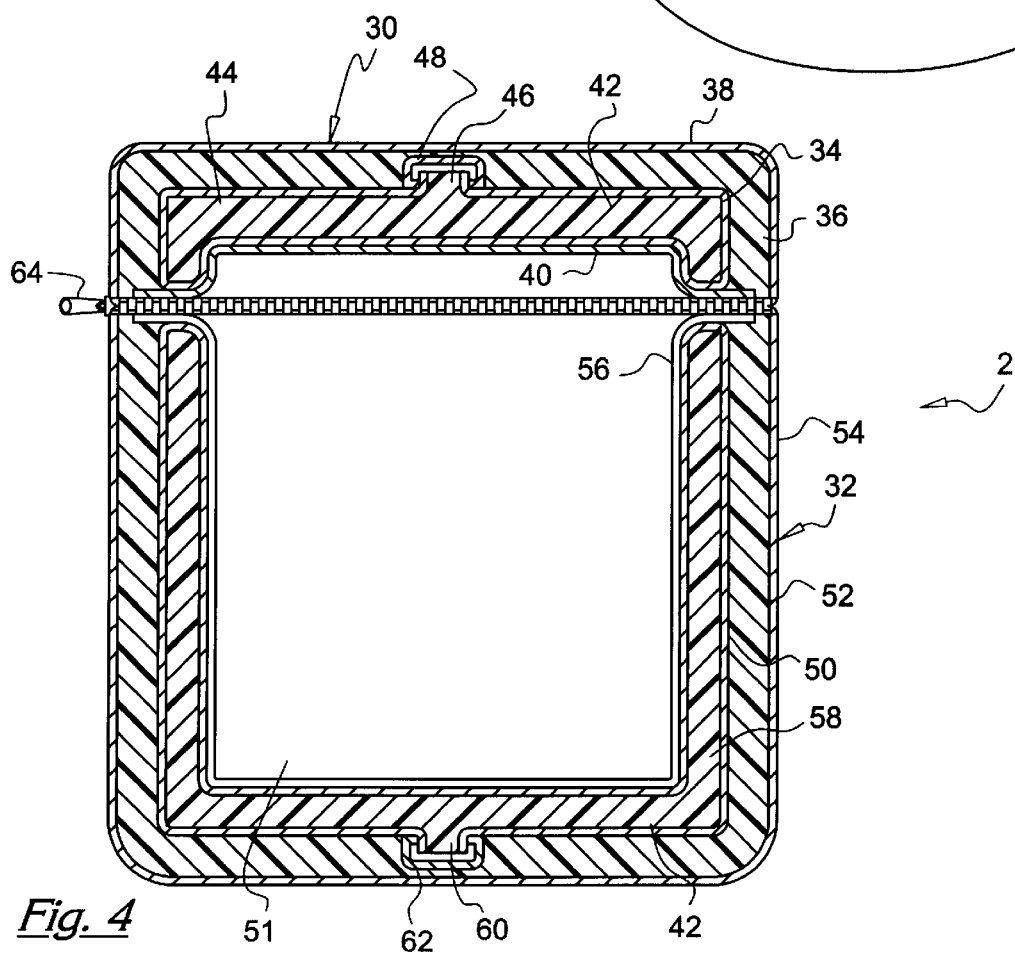
FIG. 4 is a cross sectional view of a second embodiment of a carrying case for protecting heat sensitive materials in accordance with the present invention.

With reference to FIGS. 3 & 4, a second embodiment of the carrying case for protecting heat sensitive materials 2 includes a cover 30, a container 32, and a closure device. The closure device seals a bottom of the cover 30 to a top of the container 32. The cover 30 includes a cover PCM retainer 34, a cover insulation layer 36, a cover outer fabric layer 38, and a cover inner fabric layer 40. The cover PCM retainer 34 includes a hollow cavity 42 which is filled with a phase change material 44. The cover PCM retainer 34 is preferably fabricated by a blow molding process. The phase change material 44 is melted and poured through a spout 46. The spout 46 is sealed with a cap 48. A clearance opening is formed in the cover insulation layer 36 for the cap 48. Other devices or structures may be used to retain the phase change material 44, besides the cover PCM retainer 34 such as that disclosed in FIGS. 6 & 7. The use of palm kernel oil has been found satisfactory as a phase change material 44 for use with most items stored in the carrying case 2. However, other phase change materials may also be used such as Sun Wax P-116.

The cover insulation layer 36 is preferably attached to an outside surface of the cover PCM retainer 34 with any suitable attachment process. The cover insulation layer 36 is preferably fabricated from a molded polyurethane or polystyrene foam, but other materials may also be used. The cover outer fabric layer 38 is attached to an outside surface of the cover insulation layer 36 with any suitable attachment process. The cover inner fabric layer 40 is attached to an inside surface of the cover PCM retainer 34 with any suitable attachment process and the cover inner fabric layer 40 is preferably attached to the cover outer fabric layer 38.

The container 32 preferably includes a container PCM retainer 50, a container insulation layer 52, a container outer fabric layer 54, and a container inner fabric layer 56. The container PCM retainer 50 includes a hollow cavity 58 which is filled with the phase change material 44. The container PCM retainer 50 is preferably fabricated by a blow molding process. The phase change material 44 is melted and poured through a spout 60. The spout 60 is sealed with a cap 62. A clearance opening is formed in the container insulation layer 52 for the cap 62. Other devices or structures may be used to retain the phase change material 44, besides the container PCM retainer 50 such as that disclosed in FIGS. 6 & 7.

The container insulation layer 52 is attached to an outside surface of the container PCM retainer 50 with any suitable attachment process. The container insulation layer 52 is preferably fabricated from a molded polyurethane or polystyrene foam, but other materials may also be used. The container outer fabric layer 54 is attached to an outside surface of the container insulation layer 52 with any suitable attachment process. The container inner fabric layer 56 is attached to an internal cavity 51 in the container PCM retainer 50 with any suitable attachment process and the container inner fabric layer 56 is preferably attached to the container outer fabric layer 54.

Preferably, the cover 30 is pivotally attached to the container by sewing a portion of a top edge of the container outer fabric layer 54 to a portion of a bottom edge of the cover fabric layer 38; other pivotal attachment methods may also be used such as the fabric hinge 29 in the first embodiment. The closure device may be a zipper 64 as shown in FIGS. 3 & 4; a hook and loop fastener; or any other suitable closure device. The shape of the carrying case 2 is shown as a cylinder, but other shapes could also be used. Heat sensitive items are inserted into the container 32 and the closure device is sealed.

Figure 5:
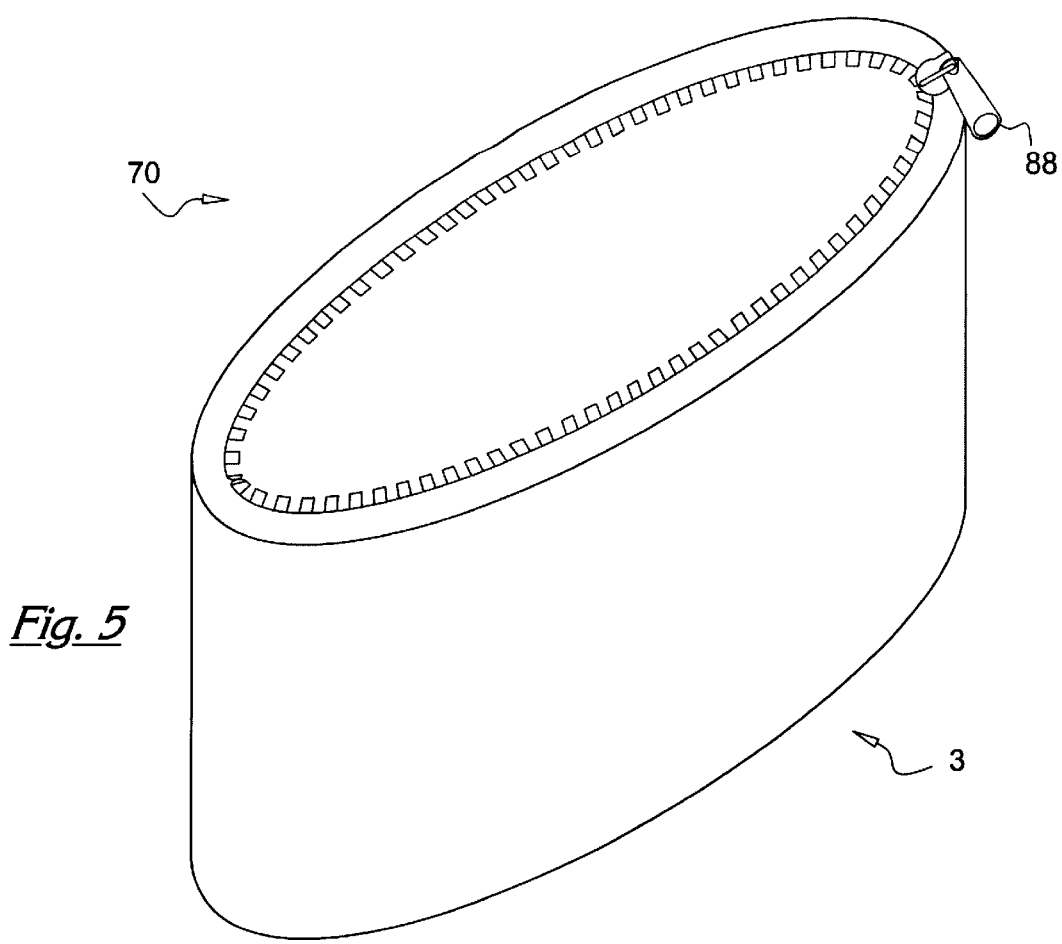
FIG. 5 is a perspective view of a third embodiment of an open carrying case for protecting heat sensitive materials in accordance with the present invention.
Figure 7:
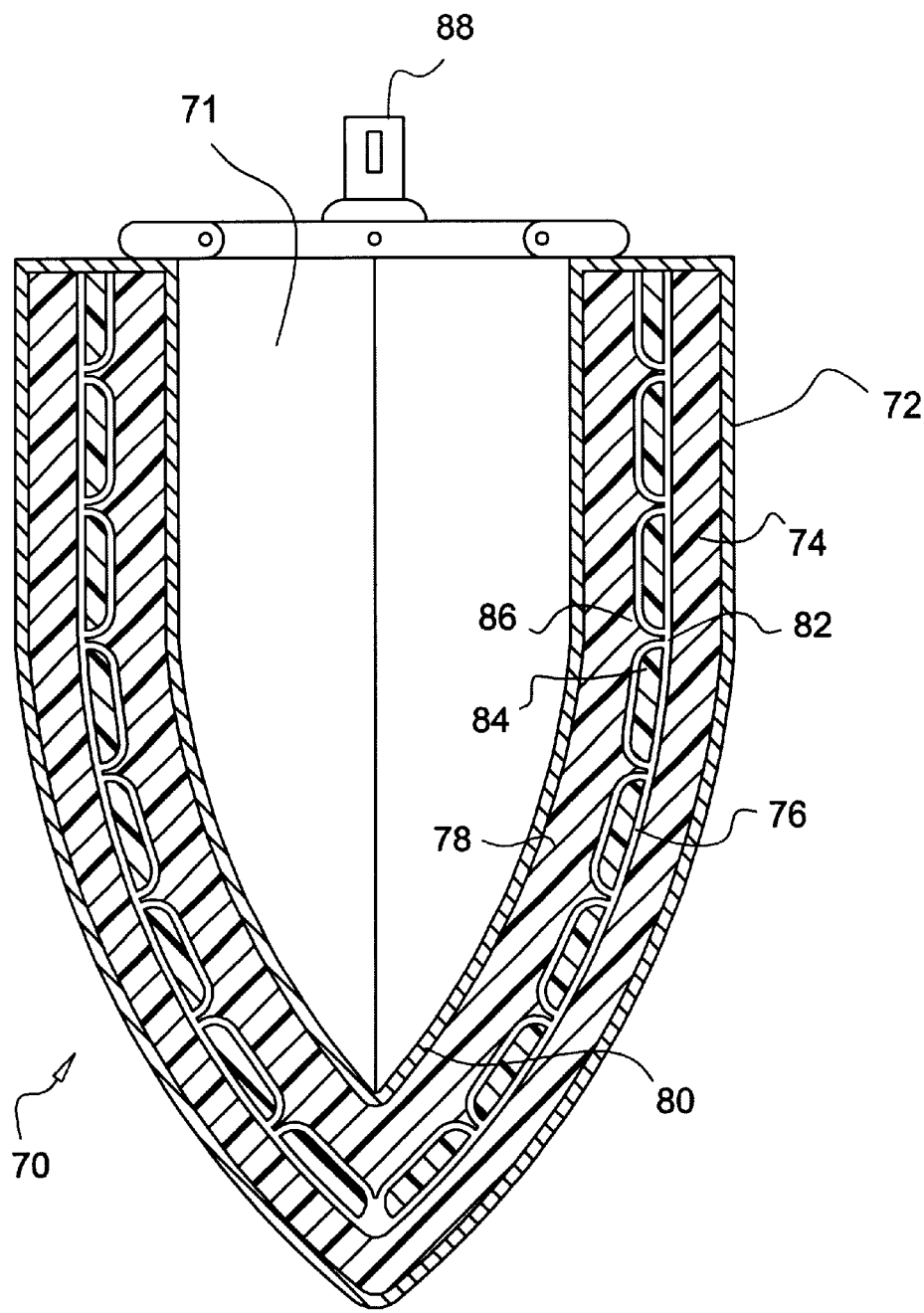
FIG. 7 is a cross sectional view of a third embodiment of a carrying case for protecting heat sensitive materials in accordance with the present invention.

With reference to FIGS. 5 and 7, a third embodiment of a carrying case for protecting heat sensitive materials 3 includes a pouch 70 which is sealable with a closure device. The wall of the pouch 70 preferably includes an outer fabric layer 72, a flexible insulating outer layer 74, a PCM retainer 76, a flexible insulating inner layer 78, and a fabric inner layer 80. The flexible insulating layers are preferably fabricated from a polyurethane foam, but other insulating materials could also be used. The PCM retainer 76 includes a first film layer 82, a second film layer 84, and phase change material 86 heat sealed between the film layers.

Figure 6:
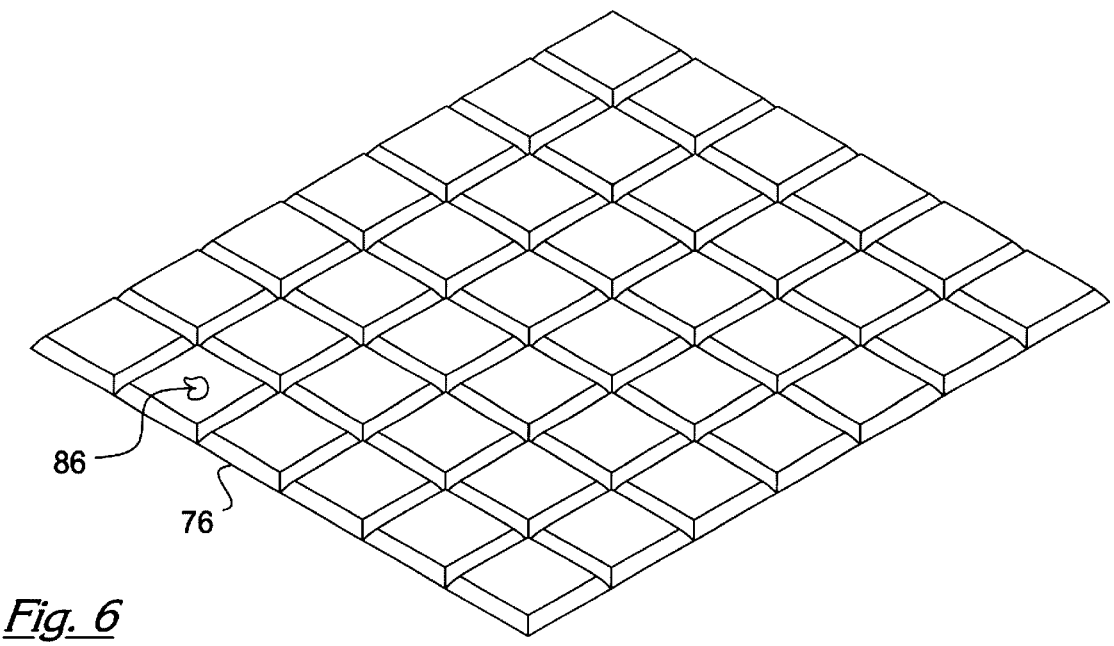
FIG. 6 is a perspective view of a phase change layer of a third embodiment of a carrying case for protecting heat sensitive materials in accordance with the present invention.

FIG. 6 shows a preferable configuration of the PCM retainer 76 with a plurality of pockets between the film layers. Other devices or structures may also be used to retain the phase change material 86. The closure device may be a zipper 88 as shown in FIGS. 5 & 7; a hook and loop fastener; or any other suitable closure device. The surfaces of the flexible insulating layers are preferably attached to the phase change layer; the outer fabric layer 72 is preferably attached to the flexible outer insulating layer 74; and the inner fabric layer 80 is preferably attached to the flexible inner insulating layer 78 to prevent bulging or bubbling. The inner wall of the pouch 70 forms an internal cavity 71. Heat sensitive items are inserted into the pouch 70 and the closure device is sealed.

The phase change material substantially matches a desired maximum temperature of at least one heat sensitive item placed in the carrying case for protecting heat sensitive materials 1–3.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of creating a carrying case for protecting at least one heat sensitive item, comprising the steps of:
    (a) forming at least one retainer for containing a phase change material having a phase change temperature which substantially matches the desired maximum storage temperature of the at least one heat sensitive item, said at least one retainer not requiring pre-conditioning to protect the at least one heat sensitive item;
    (b) covering a portion of said at least one retainer for containing a phase change material with a layer of insulating material; and
    (c) providing a means for sealing and unsealing the at least one heat sensitive item in said at least one retainer for containing a phase change material.

2. The method of creating a carrying case for protecting at least one heat sensitive item of claim 1 wherein:
    said at least one retainer for containing a phase change material being fabricated by blow molding.

3. The method of creating a carrying case for protecting at least one heat sensitive item of claim 1 wherein:
    said at least one retainer for containing a phase change material being fabricated by heat sealing two layers of film with phase change material disposed therebetween.

4. The method of creating a carrying case for protecting at least one heat sensitive item of claim 3 wherein:
    said at least one retainer for containing a phase change material having a plurality of compartments containing said phase change material.

5. The method of creating a carrying case for protecting at least one heat sensitive item of claim 1 wherein:
    the at least one heat sensitive item being one of cosmetics and medical supplies.

6. The method of creating a carrying case for protecting at least one heat sensitive item of claim 1 wherein:
    said phase change material being palm kernel oil.

7. The method of creating a carrying case for protecting at least one heat sensitive item of claim 1 wherein:
    said at least one retainer being completely surrounded by said layer of insulating material.

8. The method of creating a carrying case for protecting at least one heat sensitive item of claim 1 wherein:
    said phase change material surrounding the at least one heat sensitive item.

9. The method of creating a carrying case for protecting at least one heat sensitive item of claim 1 wherein:
    said phase change material having a phase change temperature which is higher than the optimum usage-temperature of the at least one heat sensitive item.

10. The method of creating a carrying case for protecting at least one heat sensitive item of claim 1 wherein:
    said phase change material having a phase change temperature which is higher than 80 degrees fahrenheit.

11. The method of creating a carrying case for protecting at least one heat sensitive item of claim 1 wherein:
    said phase change material having a phase change temperature which is lower than the temperature which would damage the at least one heat sensitive item due to overheating.

12. The method of creating a carrying case for protecting at least one heat sensitive item of claim 1 wherein:
    said phase change material having a phase change temperature which is lower than 110 degrees fahrenheit.

13. A method of creating a carrying case for protecting at least one heat sensitive item, comprising the steps of:
    (a) forming at least one retainer for containing a phase change material having a phase change temperature which substantially matches the desired maximum storage temperature of the at least one heat sensitive item, said at least one retainer for containing a phase change material not requiring pre-conditioning to protect the at least one heat sensitive item;
    (b) surrounding said at least one retainer for containing a phase change material with a layer of insulating material; and
    (c) providing a means for sealing and unsealing the at least one heat sensitive item in said at least one retainer for containing a phase change material.

14. The method of creating a carrying case for protecting at least one heat sensitive item of claim 13 wherein:
    said at least one retainer for containing a phase change material being fabricated by blow molding.

15. The method of creating a carrying case for protecting at least one heat sensitive item of claim 13 wherein:
    said at least one retainer for containing a phase change material being fabricated by heat sealing two layers of film with phase change material disposed therebetween.

16. The method of creating a carrying case for protecting at least one heat sensitive item of claim 15 wherein:
    said at least one retainer for containing a phase change material having a plurality of compartments containing said phase change material.

17. The method of creating a carrying case for protecting at least one heat sensitive item of claim 13 wherein:
    the at least one heat sensitive item being one of cosmetics and medical supplies.

18. The method of creating a carrying case for protecting at least one heat sensitive item of claim 13 wherein:

said phase change material being palm kernel oil.

19. The method of creating a carrying case for protecting at least one heat sensitive item of claim 13 wherein:

said phase change material surrounding the at least one heat sensitive item.

20. The method of creating a carrying case for protecting at least one heat sensitive item of claim 13 wherein:

said phase change material having a phase change temperature which is higher than the optimum usage-temperature of the at least one heat sensitive item.

21. The method of creating a carrying case for protecting at least one heat sensitive item of claim 13 wherein:

said phase change material having a phase change temperature which is higher than 80 degrees fahrenheit.

22. The method of creating a carrying case for protecting at least one heat sensitive item of claim 13 wherein:

said phase change material having a phase change temperature which is lower than the temperature which would damage the at least one heat sensitive item due to overheating.

23. The method of creating a carrying case for protecting at least one heat sensitive item of claim 13 wherein:

said phase change material having a phase change temperature which is lower than 110 degrees fahrenheit.

24. A method of creating a carrying case for protecting at least one heat sensitive item, comprising the steps of:

(a) forming at least one retainer for containing a phase change material having a phase change temperature which substantially matches the desired maximum storage temperature of the at least one heat sensitive item, said at least one retainer for containing a phase change material not requiring pre-conditioning or removal from said carrying case to protect the at least one heat sensitive item;

(b) surrounding said at least one retainer for containing a phase change material with a layer of insulating material;

(c) providing a means for sealing and unsealing the at least one heat sensitive item in said at least one retainer for containing a phase change material; and (d) retaining said insulating layer and said at least one retainer for containing a phase change material in a first portion and a second portion, said first and second portions being pivotally attached to each other.

25. The method of creating a carrying case for protecting at least one heat sensitive item of claim 24 wherein:

said at least one retainer for containing a phase change material being fabricated by blow molding.

26. The method of creating a carrying case for protecting at least one heat sensitive item of claim 24 wherein:

said at least one retainer for containing a phase change material being fabricated by heat sealing two layers of film with phase change material disposed therebetween.

27. The method of creating a carrying case for protecting at least one heat sensitive item of claim 26 wherein:

said at least one retainer for containing a phase change material having a plurality of compartments containing said phase change material.

28. The method of creating a carrying case for protecting at least one heat sensitive item of claim 24 wherein:

the at least one heat sensitive item being one of cosmetics and medical supplies.

29. The method of creating a carrying case for protecting at least one heat sensitive item of claim 24 wherein:

said phase change material being palm kernel oil.

30. The method of creating a carrying case for protecting at least one heat sensitive item of claim 24 wherein:

said phase change material surrounding the at least one heat sensitive item.

31. The method of creating a carrying case for protecting at least one heat sensitive item of claim 24 wherein:

said phase change material having a phase change temperature which is higher than the optimum usage-temperature of the at least one heat sensitive item.

32. The method of creating a carrying case for protecting at least one heat sensitive item of claim 24 wherein:

said phase change material having a phase change temperature which is higher than 80 degrees fahrenheit.

33. The method of creating a carrying case for protecting at least one heat sensitive item of claim 24 wherein:

said phase change material having a phase change temperature which is lower than the temperature which would damage the at least one heat sensitive item due to overheating.

34. The method of creating a carrying case for protecting at least one heat sensitive item of claim 24 wherein:

said phase change material having a phase change temperature which is lower than 110 degrees fahrenheit.

\* \* \* \* \*